United States Patent [19]

Kawahara

[11] 4,102,018
[45] Jul. 25, 1978

[54] CLASPING DEVICE

[75] Inventor: Akira Kawahara, Kagawa, Japan

[73] Assignee: Ryusyo Industrial Co., Ltd., Osaka, Japan

[21] Appl. No.: 817,537

[22] Filed: Jul. 20, 1977

[30] Foreign Application Priority Data

Dec. 21, 1976 [JP] Japan .................. 51-172024[U]
Mar. 19, 1977 [JP] Japan .................. 52-33682[U]
Mar. 19, 1977 [JP] Japan .................. 52-33683[U]

[51] Int. Cl.² .................. B25B 25/00; B65B 13/24
[52] U.S. Cl. .................. 24/68 CD; 24/68 D
[58] Field of Search .......... 24/19, 32, 68 R, 68 SB, 24/68 CD, 68 BT, 68 D, 68 T, 68 SK, 273; 254/51, 77, 78, 79, 161, 164

[56] References Cited

U.S. PATENT DOCUMENTS

| | | | |
|---|---|---|---|
| 2,867,406 | 1/1959 | Davis | 24/68 CD |
| 3,835,506 | 9/1974 | Berns | 24/68 D |
| 4,001,920 | 1/1977 | Johnson | 24/68 CD |
| 4,054,971 | 10/1977 | Kawahara | 24/68 CD |

FOREIGN PATENT DOCUMENTS 2,123,121 11/1971 Fed. Rep. of Germany ... 24/68 CD

Primary Examiner—Henry S. Jaudon

[57] ABSTRACT

A clasping device comprised of a frame and a manipulatable tongue pivotally connected to the frame for movement between released and fastened positions and having first, second and third cross pins and a barrier plate. A flexible strap is threaded through the tongue in such a manner as to extend, when the tongue is in the released position, through a clearance between the barrier plate and the second cross pin, past around and in contact with the second cross pin thereby forming a loop around the second cross pin, and back past beneath and in contact with the first cross pin, so that when the strap is drawn taut as the tongue is pivoted towards the fastened position portions of the strap one on each side of the strap loop are urged in overlapping relation against the first cross pin to provide substantial frictional resistance to the relative movement of the strap loop after the strap is tightened with the tongue held in the fastened position.

7 Claims, 8 Drawing Figures

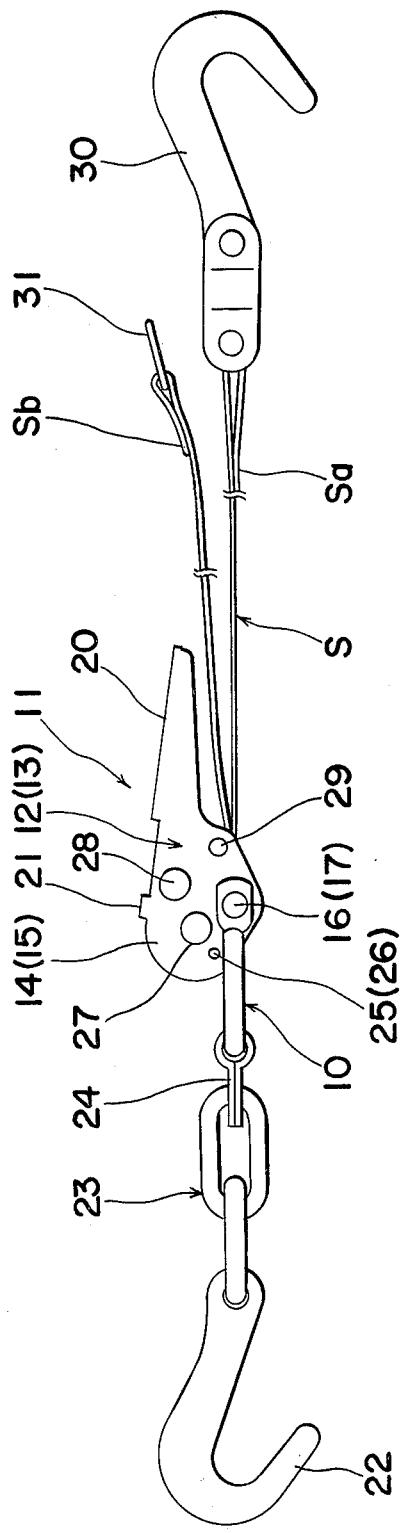

CLASPING DEVICE

BACKGROUND OF THE INVENTION

The present invention relates to a clasping device for clasping or fastening a flexible strap to hold an object firmly in position.

The U.S. Pat. No. 2,825,109, patented on Mar. 4, 1958, discloses a clasping device or buckle of a type comprising a substantially elongated frame having one end pivotally connected to a tongue or lever having a handle portion defined at one end thereof remote from the pivotal connection between the frame and the tongue. The tongue is comprised of a pair of opposed side members which are joined at the handle portion by a cross plate and at the other end by an end cross bar and an intermediate cross bar extending in spaced and parallel relation to the end cross bar. All of these elements constituting the tongue are shown to be integrally formed with each other and, for this purpose, it is obvious that the tongue is prepared from a single plate member of substantially rectangular shape by means of any known press work. In the tongue so constructed, the cross plate, end cross bar and intermediate cross bar are so positioned relative to the side members that joints between the opposed ends of any one of the cross plate, end cross bar and intermediate cross bar and respective edges of the side members provide a line or right-angled bend while the cross plate, end cross bar and intermediate cross bar lay on the same plane perpendicular to the respective edges of the side members.

As is the case with the tongue, the frame is comprised of a pair of opposed side members spaced a distance slightly greater than the distance between the side members of the tongue and connected to each other by means of a bridge member. The bridge member is so designed as to provide a retaining means for securing one end of the strap to the frame.

In the clasping device or buckle of the above mentioned U.S. patent, a portion of the strap adjacent the other end thereof is adapted, when the tongue is in a folded or released position over the frame and with the side members thereof adjacent the side members of the frame, to pass below the cross bars of the tongue, thence over the intermediate cross bar and back through a clearance between the cross bars and then below the end cross bar in contact with the body portion of the strap to form a loop around the intermediate cross bar. With this clasping device or buckle, when the strap is drawn taut as the tongue is pivoted towards a fastened position through the frame and into substantially the same plane as said frame, a double width of the strap, defined by an overlap of one portion of the strap over another portion of the same strap, is presented over the end cross bar to provide substantial frictional resistance to relative movement of the strap loop after the strap is tightened by pivoting of the tongue within the frame.

Although the prior art clasping device of the above described construction has been found to be an instrument convenient to temporarily hold packages together and to readily release them from each other. However, it has been found that the prior art clasping device has some disadvantages. By way of example, after the tongue has been pivoted to a substantially intermediate position between the released and fastened positions by the application of an external drawing force thereto during a fastening operation, an external pulling force applied to the other end of the flexible strap to held the strap taut temporarily no longer acts on a major portion of the flexible strap encircling the object to be held in position. This is because said one portion of the strap tightly presses said another portion of the same strap against the end cross bar to substantially avoid the relative movement of the strap loop around the intermediate cross bar.

In addition, when the tongue is pivoted to the fastened position, the handle portion of the tongue is held flat against and in contact with a portion of the strap emerging outwardly from the tongue and held under tension, which portion is accommodated within a space between the side members of the tongue. This means that, while the pivotal movement of the tongue from the released position towards the fastened position is satisfactory, the return movement of the tongue from the fastened position back towards the released position cannot readily be performed because there is no other way to hold the handle portion than to pull the free end of the strap in a direction required for the handle portion to separate away from the portion of the strap under tension. In most applications, not only is this procedure complicated, but also the hand of an operator grasping the free end of the strap in an attempt to move the handle portion away from the strap under tension to cause the tongue to pivot towards the released position tends to be wounded from a slip of the hand relative to the free end of the strap.

Moreover, when the prior art clasping device is not in use, the strap tends or is liable to separate or fall off from the clasping device with the free end of the strap released from the tongue. Even though the strap does not separate or fall off from the clasping device, subsequent fastening of the strap by pivoting the tongue towards the fastened position while the strap loop is considerably loosened often results in formation of one or more twists in the strap loop and/or in the major portion of the strap encircling the object to be firmly held in position.

In addition to or independently of the formation of the twist or twists, there is another possibility that the strap loop when loosened rides over the end of either one of the side members of the tongue to disengage from the end cross bar as the tongue is pivoted towards the fastened position during the fastening operation. Once the strap loop is disengaged from the intermediate cross bar after having ridden over the end of one of the side members of the tongue, the clasping device does not operate satisfactorily unless the position of the strap loop is corrected.

SUMMARY OF THE INVENTION

Accordingly, the present invention has been developed in view to substantially eliminating the above described disadvantages and inconveniences inherent in the prior art clasping device or buckle and has for its object to provide an improved clasping device of a type convenient and easy to handle and readily available for practical operation without the operator being embarrassed by the presence of any twist in the strap and/or disengagement of the strap from the clasping device.

According to one preferred embodiment of the present invention, there is provided an improved clasping device which comprises a frame in the form of a substantially U-shaped frame member, formed by bending an elongated rod to assume a substantially U-shaped configuration, and a manipulatable tongue pivotally connected to the frame for pivotal movement between released and fastened positions. The tongue is comprised of a pair of substantially elongated side plates each having first and second ends and being of a shape tapering from the first end towards the second end. The side plates are formed at their first ends with substantially circular portions, respectively, of the same shape and are connected with each other at their second ends by means of a bridge plate having its opposed side edges integral with portions of side edges of the respective side plates adjacent said second ends. The side plates so connected is spaced from each other a distance slightly smaller than the distance between the opposed ends of the U-shaped frame member. Non-rotatably extending between the substantially circular portions of the respective side plates are first, second and third cross pins.

Where a flexible strap is attached to the clasping device in such a manner that one end thereof is secured to the frame and the other end is to be held by the tongue with a major portion thereof encircling, for example, packages to be fastened together, a portion adjacent the other end of the strap is, when the tongue is held in the released position, threaded through the tongue so that the strap portion passes under the second cross pin and then back over the same second cross pin and beneath the first cross pin. Although the first and second cross pins employed in the clasping device according to the present invention and so far described functionally correspond to the end and intermediate cross bars employed in the buckle of the above described U.S. patent, the third cross pin serves, when the manipulatable tongue is pivoted to the fastened position, to keep a handle, which is defined by the second ends of the side plates in cooperation with the cross plate, in spaced relation to mutually overlapping portions of the strap which outwardly emerge from the manipulatable tongue. The space so defined between the handle and the mutually overlapping portions of the strap when the manipulatable tongue is in the fastened position permits the hand of an operator of the clasping device to be readily accessible to the manipulatable tongue when the tongue once held in the fastened position is to be pivoted towards the released position. So far as release of the packages then fastened together is involved, this feature makes it possible to utilize the clasping device of the present invention in such a situation that the fastened packages are desired to be quickly released in case of emergency.

In addition to the above described feature, there is another feature residing in the position of any one of the first and second cross pins relative to the circular portions of the side plates. According to the present invention, any one of the first and second cross pins is so positioned that a minimum distance between the outer peripheral surface of the cross pin and a peripheral edge of the circular portion of each of the side plates is substantially equal to or greater than twice the thickness of the strap used. This features substantially eliminates the possibility of such a ride-over of a portion of the strap loop as has often been experienced with the prior art clasping device or buckle. In order to enhance this feature, a barrier plate may be employed to bridge between the circular portions of the side plates, thereby substantially avoiding excessive loosening of the strap loop when the manipulatable tongue is held in the released position.

Where any twist inevitably occurs in the strap if not unavoidable even with the clasping device of the present invention, the barrier plate if employed serves another purpose, that is, to warn the operator of the presence of the twist by giving a resistance to an external drawing force which is being applied to the free end of the strap prior to the manipulatable tongue pivoted to the fastened position.

According to another preferred embodiment of the present invention, the barrier plate serves an additional purpose in cooperation with the strap so designed as to allow a substantially full length of the strap to be available for fastening packages together.

BRIEF DESCRIPTION OF THE DRAWINGS

These and other objects and features of the present invention will become apparent from the following description taken in conjunction with preferred embodiments of the present invention with reference to the accompanying drawings, in which:

FIG. 1 is a side view of a clasping device according to the present invention;

FIG. 2 is a top plan view of the clasping device shown in FIG. 1;

DETAILED DESCRIPTION OF THE INVENTION

Figure 3:
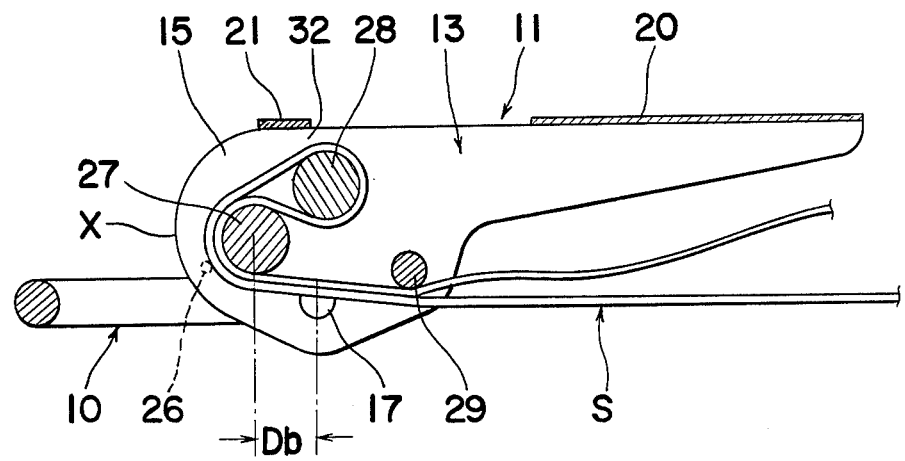
FIG. 3 is a side sectional view, on an enlarged scale, of an essential portion of the clasping device with a manipulatable tongue held in an fastened position.

Before the description of the present invention proceeds, it is to be noted that like parts are designated by like reference numerals throughout the accompanying drawings.

Referring to FIGS. 1 to 4, a clasping device according to the present invention comprises a substantially U-shaped frame member 10 pivotally connected to a manipulatable tongue 11 in a manner as will be described later. The manipulatable tongue 11 is comprised of a pair of side plates 12 and 13 of the same configuration spaced from each other a distance slightly smaller than the distance between the opposed ends of the U-shaped frame member 10. These side plates 12 and 13 have their respective first ends formed into substantially circular walls 14 and 15 and are tapered therefrom towards their respective second ends opposed to said first ends thereof.

The opposed ends of the U-shaped frame member 10 are flattened as shown and are connected to the circular walls 14 and 15 by means of separate flat-headed pins 16 and 17, which are rivetted into place and extend respectively through the flattened ends of the U-shaped frame member 10 and the circular walls 14 and 15 of the side plates 12 and 13 of the manipulatable tongue 11, so that the manipulatable tongue 11 can be pivotable between a fastened position and a released position relative to the U-shaped frame member 10 about the longitudinal axes of the rivetted pins 16 and 17. Where metal-to-metal contact is undesirable, any suitable ring member made, for example, of a hard synthetic resin may be mounted on the pins 16 and 17 between the flattened ends of the frame member 10 and the circular walls 14 and 15 as shown by 18 and 19, respectively.

The side plates 12 and 13 are connected with each other by means of a bridge plate 20 and a barrier plate 21. The bridge plate 20 has its opposed side edges integrally formed with, or otherwise rigidly connected to, the side plates 12 and 13, respectively, at the second ends of the side plates 12 and 13 to define a handle accessible to the hand of an operator of the clasping device. The barrier plate 21 is secured to the side plates 12 and 13 in a manner similar to the bridge plate 20, but is located at such a position as to bridge over a space between the circular walls 14 and 15 and substantially above the imaginary line passing in alignment with the longitudinal axes of the rivetted pins 16 and 17.

Particularly in FIGS. 1 and 2, the frame member 10 is shown to be connected with a first hook 22 through a chain, generally indicated by 23, and a connecting lug 24. It is, however, to be noted that the hook 22 may be connected directly to the frame member 10 or through a length of strap or any other connecting member instead of the employment of the connecting chain and lug 23 and 24. Alternatively, one end of a strap adapted to be threaded through the manipulatable tongue may be secured to the frame member 10.

The circular walls 14 and 15 has respective detent projections 25 and 26 outwardly protruding therefrom, the distance between the tips of the projections 25 and 26 being slightly greater than the distance between the distance between the opposed ends of the frame member 10. These detent projections 25 and 26 are cooperative with associated portions of the frame member 10 adjacent the opposed ends thereof and are so positioned as to lock the manipulatable tongue 11 in the fastened position, as shown in FIG. 1, and to ride over the associated portions of the frame member 10 during the pivotal movement of the manipulatable tongue 11 close to and away from the fastened position.

Within the space between the substantially circular walls 14 and 15 of the respective side plates 12 and 13, there are provided first, second and third cross pins 27, 28 and 29. Each of these cross pins 27, 28 and 29 is non-rotatably and axially non-movably supported in position and, for this purpose, has its opposed ends respectively rigidly connected to the circular walls 14 and 15 by any suitable method, for example, rivetting, welding, crimping or staking. These cross pins 27, 28 and 29 extend in parallel relation to each other and also to the longitudinal axes of the rivetted pins 16 and 17 and are spaced from each other in a manner as will subsequently be described with particular reference to FIGS. 3 and 4.

A length of flexible strap S is shown to have one end Sa pivotally or loosely connected with a hook 30 and the other end Sb pivotally or loosely connected with a substantially rectangular eyelet 31 of a width greater than the distance between the side plates 12 and 13. Connection of one or all of the hook 30 and eyelet 31 to the strap S may be made after the strap S has been threaded through the manipulatable tongue 11 in such a manner that, when the manipulatable tongue 11 is held in the released position as shown in FIG. 4, a portion of the strap S intermediately between the opposed ends thereof extends from the first-mentioned end Sa through a clearance between the barrier plate 21 and the second cross pin 28, past around and in contact with the second cross pin 28, thereby forming a loop, and back past beneath and in contact with the first cross pin 27, with the second-mentioned end Sb emerging outwardly of the manipulatable tongue 11.

Figure 4:
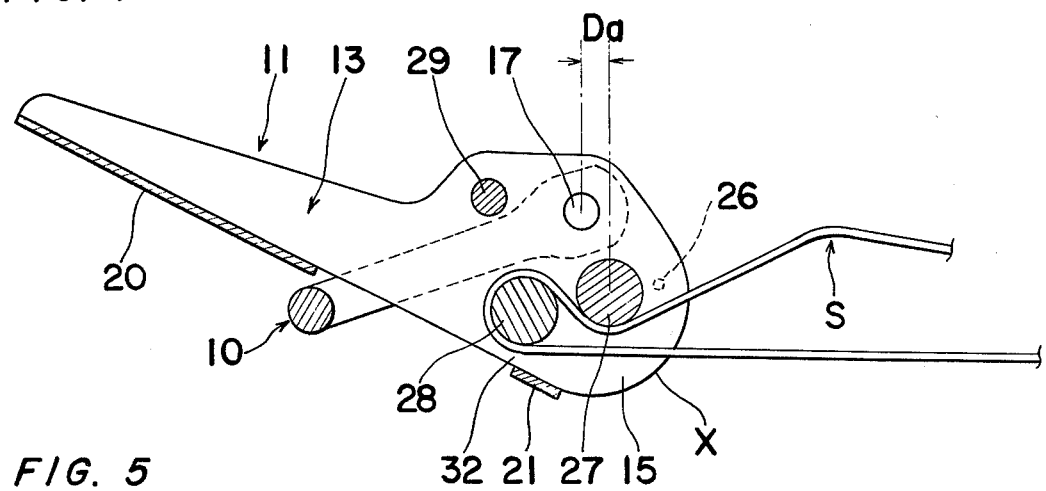
FIG. 4 is a view similar to FIG. 3, showing the manipulatable tongue held in a released position.

With the strap S so threaded, the manipulatable tongue 11 can be locked by pivoting the handle from the released position, as shown in FIG. 4, to the fastened position, as shown in FIG. 3, while a snubbing or drawing force is applied to the eyelet 31 or a portion of the strap S adjacent the eyelet 31 during the pivotal movement of the tongue 11 from the released position towards the fastened position and prior to the tongue 11 arriving at the fastened position. As the manipulatable tongue 11 approaches the fastened position, a portion of the strap S between the strap loop around the second cross pin 28 and the eyelet 31, which turns around and is in contact with the first cross pin 27, is firmly pressed against the first cross pin 27 with another portion of the strap S between the strap loop and the hook 30 which overlaps said portion of the strap S between the strap loop and the eyelet 31, thereby providing substantial frictional resistance to relative movement of the strap loop. Simultaneously therewith, the frame member 10 and that portion of the strap S which extends between the first cross pin 27 and the hook 30 are moved close to each other so that that portion of the strap S between the first cross pin 27 and the hook 30, if the strap S is used to secure or anchor a package to any suitable foundation with the hooks 22 and 30 respectively connected to the foundation and the package, can be held taut upon arrival of the manipulatable tongue 11 at the fastened position to secure the package firmly in position. The distance of relative movement of the hook 22, that is, the frame member 10, and that portion of the strap S between the first cross pin 27 and the hook 30, which involves the amount of tension the clasping device of the present invention imparts on the strap S when the manipulatable tongue 11 is held in the fastened position, is substantially equal to the sum of distances respectively designated by Da and Db in FIGS. 4 and 3. In other words, the amount of tension imparted on the strap S when the manipulatable tongue 11 is pivoted to the fastened position is determined by an angular distance through which the longitudinal axis of the first cross pin 27 travels as the manipulatable tongue 11 is pivoted from the released position to the fastened position.

The third cross pin 29, positioned on one side of the second cross pin 28 remote from the first cross pin 27 and occupying one of the apexes of a geometric triangle with the other apexes respectively occupied by the first and second cross pins 27 and 28, serves to keep the handle on the tongue 11 in spaced relation to the portion of the strap S between the first cross pin 27 and the hook 30 when the manipulatable tongue 11 is held in the fastened position as best shown in FIG. 4. In other words, the third cross pin 29 is so positioned that the operator of the clasping device can readily be accessible to the handle, when the manipulatable tongue 11 is desired to be pivoted from the fastened position back towards the released position, with his hand inserted in between the handle and the portion of the strap under tension between the first cross pin 27 and the hook 30.

In order to ensure that the manipulatable tongue 11 when pivoted to the fastened position can be locked in the fastened position by the aid of a detent mechanism constituted by the detent projections 25 and 26 cooperative with the portions of the frame member 10 adjacent the opposed ends thereof, the first cross pin 27 is so positioned that portions of the strap S, which extend between the first cross pin 27 and the third cross pin 29 in overlapped relation with each other when the manipulatable tongue 11 is held in the fastened position as shown in FIG. 4, lay above the mutually aligned longitudinal axes of the respective rivetted pins 16 and 17. In addition, for avoiding any possible disengagement of the strap S which may otherwise takes place in such a manner that a portion of the strap between the second cross pin 28 and the hook 30 rides over the peripheral edge of either of the circular walls 14 and 15 when the strap S is loosened, the position of the first cross pin 27 is so selected that a minimum distance between the peripheral surface of said pin 27 and the peripheral edge, as at X, of any one of the circular walls 14 and 15 is about two to three times the thickness of the strap employed.

The second cross pin 28 is so positioned relative to the first cross pin 27 as to assume a position substantially intermediately between the first and third cross pins 27 and 29 and above a line connecting therebetween and also to assume such a position, while the snubbing or drawing force is applied to the end Sb of the strap S when the manipulatable tongue 11 is pivoted to the released position, that a portion of the strap S in contact with the third cross pin 29 is spaced a predetermined minimum distance, for example, about 1 mm., from the portion of the strap S which had been, or is to be, overlapped with said portion of the strap S in contact with the pin 29 when the manipulatable tongue 11 is in the fastened position, as best shown in FIG. 4. Moreover, as is the case with the first cross pin 27, the second cross pin 28 is so spaced from the barrier plate 21 as to define a substantially ribbon-shaped clearance 32 between said plate 21 and the peripheral surface of the second cross pin 28, the width of said clearance 32 being so selected as to be two to three times the thickness of the strap employed.

The clearance 32 having the width so selected as hereinbefore described is advantageous in that, assuming that a twist is formed on the portion of the strap S between the second cross pin 28 and the hook 30 prior to the manipulatable tongue 11 pivoted to the fastened position and that the operator of the clasping device applies the snubbing or drawing force to the end Sb of the strap S to absorb a slackening of the strap S without knowing the presence of the twist, the clearance 32 does not allow the twisted portion of the strap S to pass therethrough, thereby warning the operator of the presence of the twist in the strap S.

The eyelet 31 on the end Sb of the strap S may not be always necessary, considering the possibility of the clasping device of the present invention operable with any type of strap if the latter has a width sufficient to be accommodated within the spacing between the side plates 12 and 13. However, the employment of the eyelet 31 of the width greater than the distance between the side plates 12 and 13 on the end Sb of the strap S such as shown is, even though it results in non-detachability of the strap in relation to the clasping device of the present invention, is advantageous in that any possible fall-out of the strap S from the clasping device, particularly, the manipulatable tongue 11 through which it has been threaded, can be avoided. Without the eyelet of the type referred to above, the possible fall-out may occur accidentally or by erroneously pulling a portion of the strap S between the device and the hook 30 when the manipulatable tongue 11 is in the released position.

Figure 5:
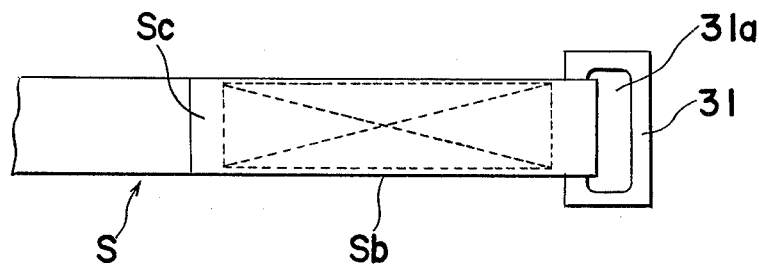
FIG. 5 is a top plan view of a free end portion of a strap.
Figure 6:
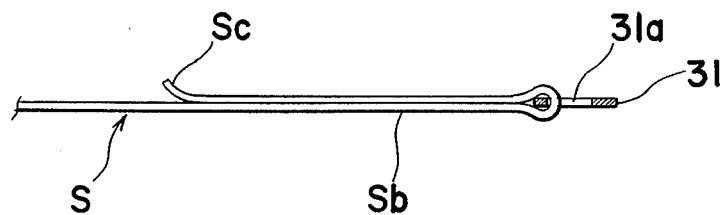
FIG. 6 is a side sectional view of the free end portion of the strap shown in FIG. 6.
Figure 8:
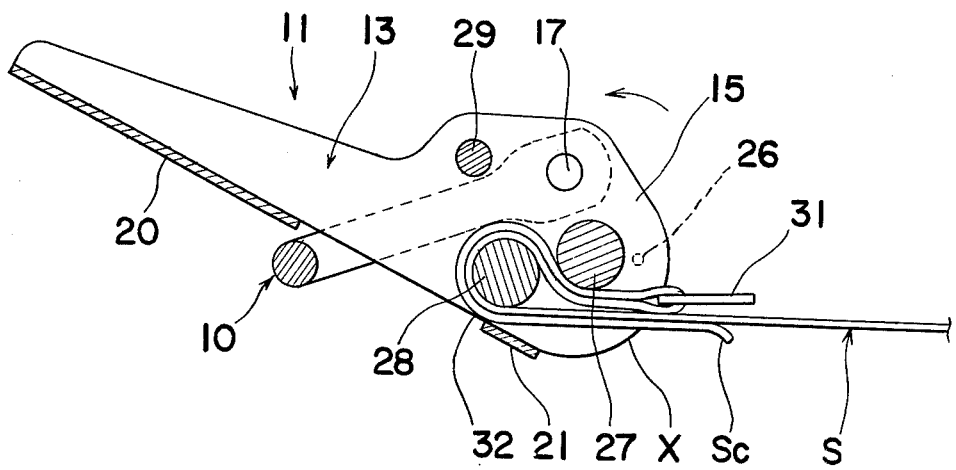

Moreover, the employment of the eyelet 31 provides an additional advantage that, since the eyelet 31 has a slot 31a defined therein of a size sufficient to accommodate some fingers of the operator of the clasping device of the present invention, a substantially full length of strap can be used in fastening a package to any suitable foundation or fastening packages firmly together. By way of example, when the manipulatable tongue 11 is in the released position and a substantially full length of the strap S is used to encircle packages to be fastened together with one side edge of the eyelet 31 engaged to the peripheral edges of the walls 14 and 15 of the respective side plates 12 and 13 (such as shown in FIG. 8), the snubbing or drawing force to be applied to the end Sb of the strap S, prior to the manipulatable tongue 11 being pivoted towards the fastened position, for the purpose of absorbing a slackening of the strap S, can be applied to the end Sb of the strap S by way of the eyelet 31 in a manner with some fingers of the operator inserted through the slot 31a.

Where it is not desirable that, at the time a substantially full length of the strap S is used to encircle packages to be fastened together, one side edge of the eyelet 31 is engaged to the peripheral edges of the circular walls 14 and 15 and where it is desired to provide means with which the operator of the clasping device can recognize the availability of the length of strap in encircling packages to be fastened together or fastening a package to a suitable foundation, connection between the strap end Sb and the eyelet 31 may be made in such a manner as will now be described with reference to FIGS. 5 and 6.

Referring now to FIGS. 5 and 6, the strap end Sb is, after having inserted through the slot 31a and then turned back over the remaining portion of the strap S, secured in overlapping relation to such remaining portion of the strap S by any suitable method, for example, sewing or fusion-bonding or by the use of an adhesive agent, with the extremity of the strap end Sb left unsecured as indicated by Sc. Where the strap S is made of a webbing, i.e., woven or braided band, of threads or fibers, the end extremity Sc of the strap should be rigidly united to avoid any possible fraying of threads or fibers employed to form the strap S.

Figure 7:
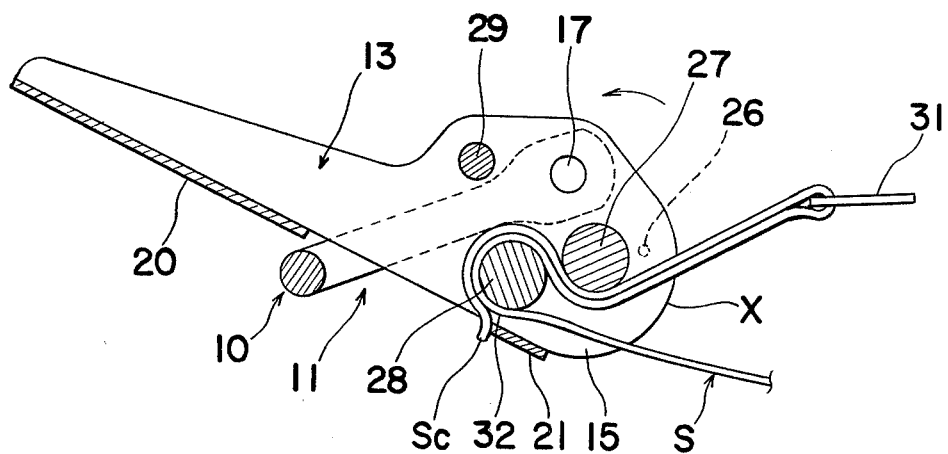
FIGS. 7 and 8 are views respectively similar to FIGS. 3 and 4, showing the clasping device operable with the strap having its free end designed as shown in FIGS. 5 and 6.

As best shown in FIG. 7, the free end extremity Sc of the strap S, which is left unsecured relative to the other portion of the strap S, is cooperative with the barrier plate 21, in a manner as will subsequently be described in detail. Assuming that the portion of the strap S extending between the second cross pin 28 and the hook 30 is outwardly pulled relative to the clasping device when and so long as the manipulatable tongue 11 is held in the released position, the eyelet 31 is drawn close towards the manipulatable tongue 11 with the overlapping portions of the strap S adjacent the eyelet 31 passing beneath and in contact with the first cross pin 27 and then over and in contact with the second cross pin 28. Since the free end extremity Sc tends to protrude in the tangential direction of the imaginary circle assumed by the portion of the strap S around the second cross pin 28 as the overlapping portions of the strap S adjacent the eyelet 31 pass over and in contact with the second cross pin 28, the free end extremity Sc is ultimately brought in position to engage against the barrier plate 21 as best shown in FIG. 7. Upon engagement of the free end extremity Sc of the strap S against the barrier 21, the strap S can no longer be outwardly pulled in a direction of the hook 30 with the eyelet 31 substantially spaced a predetermined distance from the circular walls 14 and 15. Where the clasping device of the present invention utilizes the strap S having the strap end connected with the eyelet 31 in the manner as described above and shown in FIGS. 5 and 6, the clearance 32 between the barrier 21 and the peripheral surface of the second cross pin 28 is preferred to have a minimum width greater than the thickness of the strap S used, but not exceeding three times the thickness of the strap S. However, in the worst it may happen, for example, if the portion of the strap between the second cross pin 28 and the hook 30 is, when the manipulatable tongue 11 is in the released position, pulled outwardly of the clasping device so strongly as to cause the free end extremity Sc of the strap to pass through the clearance 32, no fall-out or separation of the strap S from the clasping device occur because of the eyelet 31 engaged to the circular walls 14 and 15 in the manner as described above and shown in FIG. 8.

Although the present invention has fully been described in connection with the preferred embodiments thereof with reference to the accompanying drawings, it is to be noted that various changes and modifications are apparent to those skilled in the art. By way of example, the barrier 21 bridging between the side plates 12 and 13 may have a width sufficient to cover an opening defined between substantially semi-circular peripheral edges of the respective circular walls 14 and 15 which face the frame member 10 when the manipulatable tongue 11 is in the fastened position. Moreover, the first cross pin 27 may have its peripheral surface knurled to provide a pattern of identations to avoid any possible slip of the strap portion around the first cross pin 27 relative to the first cross pin 27.

Furthermore, without utilizing the hook 22 and the connecting member used to connect the hook 22 to the frame member 10, and also without utilizing the hook 30 on the strap end Sa, the strap end Sa may be directly connected to the frame member 10. Alternatively, without utilizing the connecting member for connecting the hook 22 to the frame member 10, the hook 22 may be connected to the frame member 10 through a length of strap in a manner similar to the strap S.

Therefore, these changes and modifications are to be understood as included within the true scope of the present invention unless they depart therefrom.

What is claimed is:

1. A clasping device comprising:

a frame means having a pair of spaced connections, aligned with and positioned adjacent each other, and having an opening defined between said connections;

a manipulatable tongue means pivotable within the opening between the connections of the frame means and comprised of a pair of substantially elongated plate members spaced a distance slightly smaller than the distance between the connections of the frame means at the opening, each of the plate members having a first end and a second end opposite said first end, the first ends of the respective plate members being connected with each other by means of a bridge plate integral therewith and the second ends of the plate members being integrally formed with respective substantially circular walls, said tongue means being connected to the frame means with the connections respectively pivoted to the substantially circular walls to define an axis of pivot about which the manipulatable tongue means is movable between released and fastened positions relative to the frame means;

a first cross pin member extending between the substantially circular walls with its opposed ends rigidly secured thereto and positioned inwardly of the walls with its peripheral surface spaced a first predetermined minimum distance from a peripheral edge portion of any one of the walls which is remote from the first end of the corresponding plate member;

a second cross pin member extending in spaced and parallel relation to the first cross pin member between the substantially circular walls with its opposed ends rigidly secured thereto and positioned inwardly of the walls and substantially rearwardly of the first cross pin member in terms of a direction of the first end of any one of the plate members;

a barrier member having its opposed ends connected to respective peripheral edge portions of the substantially circular walls, said barrier member extending in spaced and parallel relation to any one of said first and second cross pin members and cooperating with the second cross pin member to define a substantially ribbon-shaped clearance, said barrier member being spaced a second predetermined minimum distance from the peripheral surface of the second cross pin member;

a flexible strap having first and second ends respectively connected with an anchoring means and a slotted plate member, said flexible strap when the manipulatable tongue means is held in the released position extending from the anchoring means through the clearance between the second cross pin member and the barrier member, past around and in contact with the second cross pin member thereby forming a loop around the second cross pin member, and back past beneath and in contact with the first cross pin member, with the second end of said strap emerging outwardly of the manipulatable tongue means, so that when the strap is drawn taut as the tongue means is pivoted towards the fastened position portions of the strap one on each side of the loop are urged in overlapping relation to each other against the first cross pin member to provide substantial frictional resistance to relative movement of the strap loop after the strap is tightened by pivoting of the tongue means to the fastened position, said first predetermined distance being within the range of two times the thickness of the strap to three times the thickness of the strap; and a third cross pin member extending between the substantially circular walls with its opposed ends rigidly secured thereto and positioned substantially rearwardly of the second cross pin member in terms of the direction of the first end of any one of the plate members, said third cross pin member being further so positioned as to provide an access clearance between the first ends of the plate members and the strap when the tongue means is pivoted to the fastened position with said first ends of said plate members spaced from said strap.

2. A clasping device as claimed in claim 1, wherein the second predetermined minimum distance is within the range of a value greater than the thickness of the strap to a value equal to three times the thickness of the strap.

3. A clasping device as claimed in claim 1, wherein said slotted plate member is of substantially rectangular shape having a width greater than the distance between the plate members of the tongue means.

4. A clasping device as claimed in claim 2, wherein the slotted plate member is of substantially rectangular shape having a width greater than the distance between the plate members of the tongue means.

5. A clasping device as claimed in claim 2, wherein the second end of the strap is connected to the slotted plate member after having passed through the slot in the slotted plate member and then secured to a substantially intermediate portion of the strap in overlapping relation the free end extremity of said second end of the strap being left unsecured, said free end extremity being cooperative with the barrier member to avoid any possible passage of the free end extremity therethrough in the direction of the anchoring means.

6. A clasping device as claimed in claim 3, wherein the second end of the strap is connected to the slotted plate member after having passed through the slot in the slotted plate member and then secured to a substantially intermediate portion of the strap in overlapping relation the free end extremity of said second end of the strap being left unsecured, said free end extremity being cooperative with the barrier member to avoid any possible passage of the free end extremity therethrough in the direction of the anchoring means.

7. A clasping device as claimed in claim 4, wherein the second end of the strap is connected to the slotted plate member after having passed through the slot in the slotted plate member and then secured to a substantially intermediate portion of the strap in overlapping relation the free end extremity of said second end of the strap being left unsecured, said free end extremity being cooperative with the barrier member to avoid any possible passage of the free end extremity therethrough in the direction of the anchoring means.

* * * * *